(12) United States Patent
Krolo

(10) Patent No.: US 12,349,623 B2
(45) Date of Patent: Jul. 8, 2025

(54) BLADE HOLDER ADAPTER

(71) Applicant: Honda Motor Co., Ltd., Tokyo (JP)

(72) Inventor: Ante Krolo, Offenbach/Main (DE)

(73) Assignee: Honda Motor Co., Ltd., Tokyo (JP)

( * ) Notice: Subject to any disclaimer, the term of this patent is extended or adjusted under 35 U.S.C. 154(b) by 726 days.

(21) Appl. No.: 17/707,946

(22) Filed: Mar. 29, 2022

(65) Prior Publication Data

US 2023/0309445 A1   Oct. 5, 2023

(51) Int. Cl.
*A01D 34/73* (2006.01)
*A01D 34/00* (2006.01)
*A01D 101/00* (2006.01)

(52) U.S. Cl.
CPC .......... *A01D 34/733* (2013.01); *A01D 34/008* (2013.01); *A01D 2101/00* (2013.01)

(58) Field of Classification Search
CPC .. A01D 34/733; A01D 34/008; A01D 34/828; A01D 2101/00; A01D 75/18; A01D 75/20
See application file for complete search history.

(56) References Cited

U.S. PATENT DOCUMENTS

| 3,050,925 A | 8/1962 | West et al. |
| 6,178,729 B1 * | 1/2001 | Vastag ................. A01D 34/005 56/255 |
| 2021/0185910 A1 * | 6/2021 | Takeichi ................ A01D 34/78 |

FOREIGN PATENT DOCUMENTS

| DE | 102010045496 A1 * | 3/2012 | .......... A01D 34/733 |
| EP | 1611782 A1 * | 1/2006 | .......... A01D 34/733 |
| WO | WO-2018117190 A1 * | 6/2018 | .......... A01D 34/008 |

* cited by examiner

*Primary Examiner* — Matthew Troutman
*Assistant Examiner* — Sunny D Webb
(74) *Attorney, Agent, or Firm* — JCIPRNET

(57) ABSTRACT

A lawn mower includes a shaft rotated by a drive source, a blade, and a blade holder fixing the shaft and the blade. The blade holder has a holder base holding the blade, and a holder adapter holding the shaft, wherein the holder adapter includes a fragile part configured to be inserted into the blade.

12 Claims, 4 Drawing Sheets

BLADE HOLDER ADAPTER

BACKGROUND

Technical Field

The disclosure relates to a lawnmower, and more specifically relates to a blade holder adapter of the lawn mower.

Description of Related Art

A lawn mower may include a fragile part (a shear pin) that breaks when excess load is generated on a blade of a lawn mower. When the shear pin is configured as a separate body from a blade holder of the lawn mower, the number of components such as a bolt, nut, washer, and the like may increase, causing a manufacturing time for performing assembly work, such as press fitting the shear pin to the blade holder and/or fastening the components to assemble the blade holder, to increase.

On the other hand, when the shear pin is configured as a single body (integrally formed) with the blade holder, then the entire base holder must be replaced when the shear pin breaks which may lead to increased cost.

Accordingly, a solution is needed for easier assembly of the blade holder and/or reducing the cost of the replacement parts of the blade holder.

SUMMARY

According to an embodiment of the disclosure, a lawn mower includes a shaft rotated by a drive source, a blade, and a blade holder fixing the shaft and the blade. The blade holder has a holder base holding the blade, and a holder adapter holding the shaft, wherein the holder adapter includes a fragile part.

DESCRIPTION OF THE EMBODIMENTS

Figure 1:
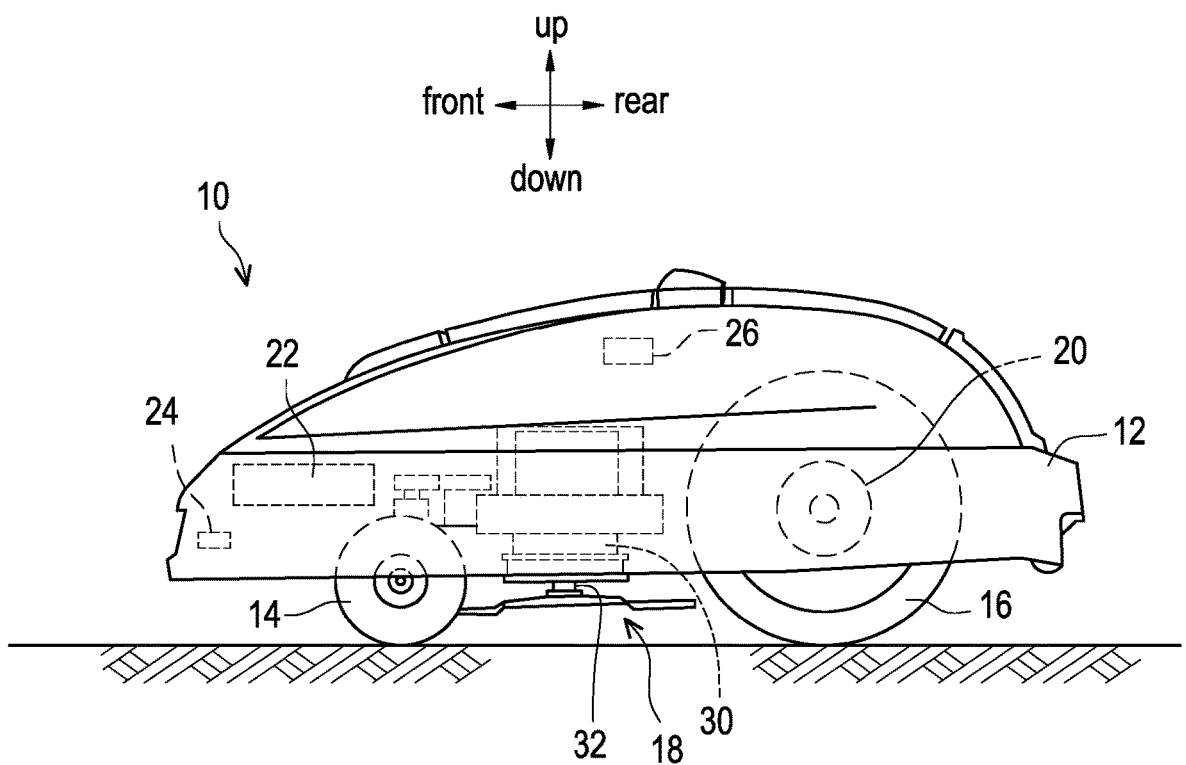
FIG. 1 is a schematic diagram illustrating a lawnmower according to an embodiment of the disclosure.

According to an exemplary embodiment of the disclosure, a lawnmower is provided. FIG. 1 is a schematic diagram illustrating a lawnmower according to an embodiment of the disclosure. Referring to FIG. 1, the lawnmower 10 is an autonomous driving lawnmower (often referred to as robotic lawnmower) that can autonomously travel to mow the grass. However, the disclosure is not limited thereto. In another embodiment of the disclosure, the lawnmower may be, for example, a handheld lawn mower with wheels and the like. In another embodiment of the disclosure, the lawnmower 10 may be, for example, a handheld lawn mower without wheels and the like.

Referring to FIG. 1, in the present embodiment, the lawnmower 10 includes a housing 12, a pair of front wheels 14 and a pair of rear wheels 16 provided on the housing 12. The lawnmower 10 further includes a motor 30. The motor 30 is an example of a drive source of the disclosure. The motor 30 includes a shaft 32 extending from the motor 30 and the shaft 32 is rotated by the motor 30. In the present embodiment, the shaft 32 has a circular cross section. However, the shaft 32 may have a cross section of any shape and is not intended to limit the disclosure. For example, the shaft 32 may have a square shape, a polygonal shape, and the like. One end of the shaft 32 is coupled to the motor 30 while another end of the shaft 32 is coupled to a working part 18 (including the blade). The another end of the shaft 32 may include a key for coupling with the working part 18. The working part 18 is provided between the front wheels 14 and the rear wheels 16. The working part 18 is disposed at a one side of the housing 12. The rear wheels 16 are individually driven by a pair of travel motors 20, respectively.

The housing 12 is provided with a battery 22 that supplies power to the travel motors and other electric devices, a detection sensor group 24 which may include an obstacle detection sensor (such as a contact sensor), an angular velocity sensor, an acceleration sensor, etc., and a control unit 26 that controls the driving of the travel motors 20 and the working part 18 according to the detection signals of the detection sensor group 24. The control unit 26 may include a processor.

The lawnmower 10 can travel straight forward and rearward by driving the travel motors 20 in the forward and rearward direction, respectively, at a same speed, and can turn right and left by driving the travel motors 20 at different speeds in corresponding manners. The working part 18 is supported by the housing 12.

Figure 2:
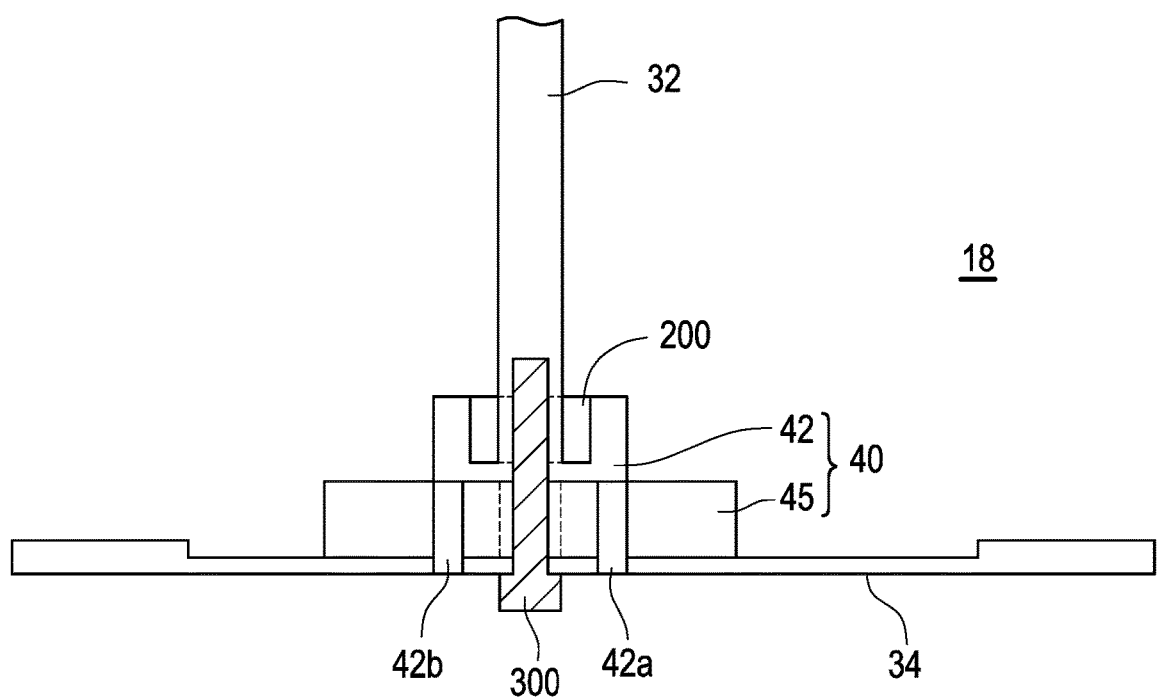
FIG. 2 is a sectional view diagram of a working part of the lawnmower according to an embodiment of the disclosure.

FIG. 2 is a sectional view diagram of a working part of the lawnmower according to an embodiment of the disclosure. Referring to FIG. 2, the working part 18 includes a blade 34 coupled to the shaft 32. The blade 34 is rotated together with the rotation of the shaft 32 and cuts grass. More specifically, the blade 34 is coupled to the another end of the shaft 32 by a blade holder 40. The blade holder 40 fixes the shaft 32 and the blade 34 together such that the blade 34 rotates together with the rotation of the shaft 32. In other words, the shaft 32 is fixed to the blade holder 40 and the blade 34 is fixed to the blade holder 40, such that the blade 34 rotates together with the rotation of the shaft 32 and relative rotation between the shaft 32 and the blade 34 is prevented/minimized. In this way, the blade 34 is rotatably driven by the mowing motor 30 via the shaft 32 and the blade holder 40.

The blade holder 40 includes a holder base 45 and a holder adapter 42. In the present embodiment, a collar 200 is disposed between the shaft 32 and the holder adapter 42. In the present embodiment, the collar 200 has a hollowed cylindrical shape that fits onto the other end of the shaft 32. That is to say, the collar 200 has a ring shape. However, in another embodiment of the disclosure, the collar 200 may have, for example, a rectangular shape or a polygonal shape. In another embodiment, the collar 200 may be omitted.

Figure 3:
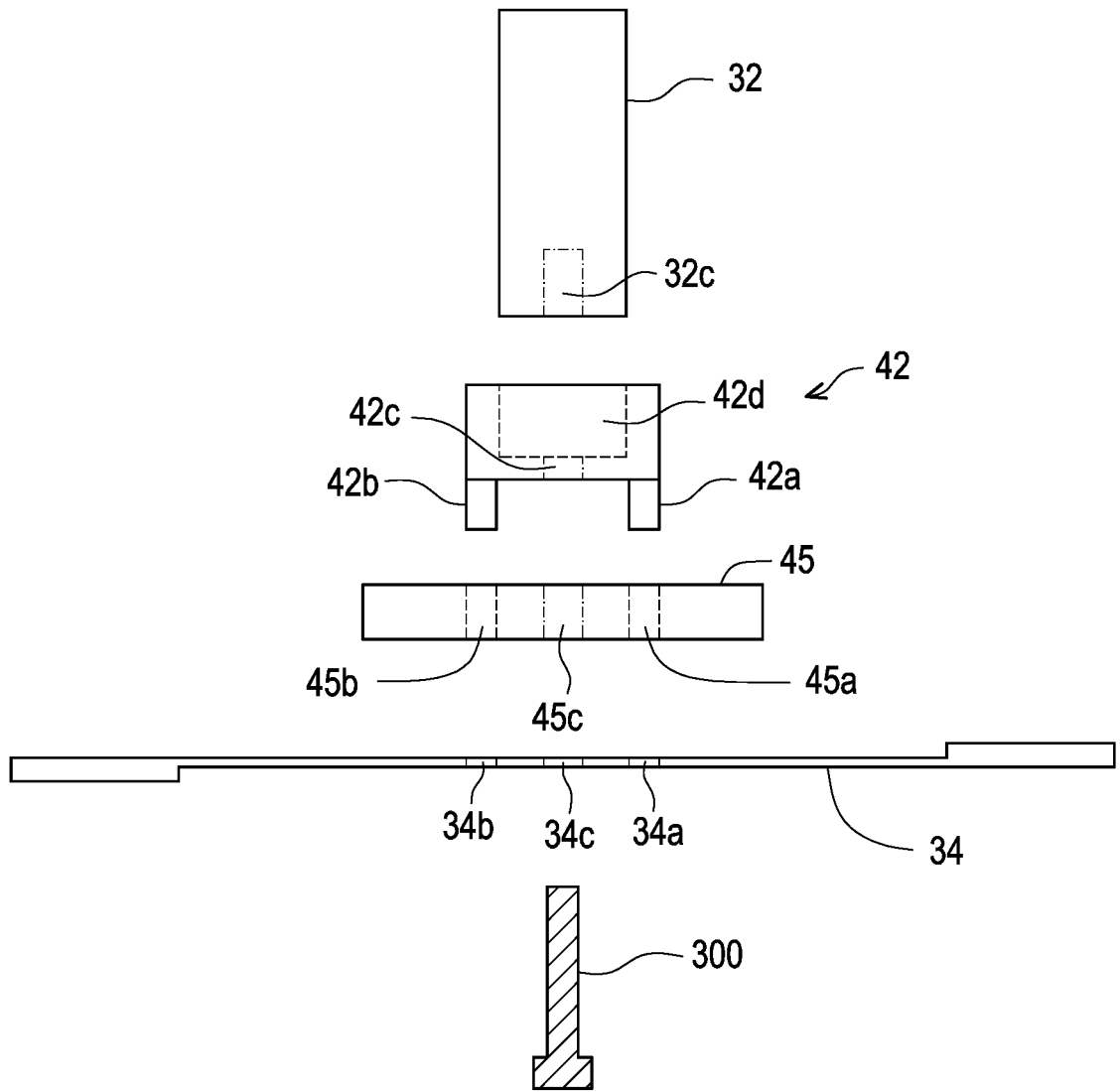
FIG. 3 illustrates an exploded view of the working part of FIG. 2.

FIG. 3 illustrates an exploded view of the working part of FIG. 2. Referring to FIG. 3, the holder adapter 42 has a rectangular shape having a thickness. The holder adapter 42 has an insertion hole 42d for inserting the shaft 32. Additionally, the holder adapter 42 has a hole 42c penetrating the holder adapter 42 in the thickness direction. The shape of the insertion hole 42d is a substantially circular shape to accommodate the shape of the circular shaft 32. However, the shape of the insertion hole 42d may be any shape, for example, a rectangular shape or a polygonal shape, to accommodate the shape of the shaft 32 or a key of the shaft 32 according to requirements.

Furthermore, the holder adapter 42 includes a first fragile part 42a and a second fragile part 42b. The first fragile part 42a and the second fragile part 42b protrude from a surface of the holder adapter 42 that is away from the motor 30. More specifically, the first fragile part 42a and the second fragile part 42b protrude from the holder adapter 42 in a direction away from the shaft 32. The first fragile part 42a and the second fragile part 42b have a circular cross section and extend from the holder adapter 42. A diameter of the first fragile part 42a and a diameter of the second fragile part 42b is smaller than a diameter of the shaft 32. The first fragile part 42a and the second fragile part 42b are each examples of a fragile part of the disclosure and may have a cross section of another shape according to requirements and is not limited to circular. In more detail, the first fragile part 42a and the second fragile part 42b act as shear pins, and are designed to break when excess load is generated on the blade 34 of the lawn mower 10, to prevent damage to the shaft 32 and/or the blade 34.

The first fragile part 42a and the second fragile part 42b are integrally formed with the holder adapter 42. In this way, a material of the first fragile part 42a and the second fragile part 42b is the same material as a material of the holder adapter 42. When the first fragile part 42a and the second fragile part 42b are integrally formed with the holder adapter 42, the first fragile part 42a and the second fragile part 42b do not need to be press fitted or attached to the holder adapter 42 by a separate process and the manufacturing time of the blade holder 40 may be reduced.

Referring to FIG. 3, the holder base 45 has a substantially rectangular shape having a thickness. The holder base 45 has a first insertion hole 45a for inserting the first fragile part 42a and a second insertion hole 45b for inserting the second fragile part 42b. The first insertion hole 45a and the second insertion hole 45b penetrate the holder base 45 in the thickness direction. Additionally, the holder base 45 has a hole 45c penetrating the holder base 45 in the thickness direction. The first insertion hole 45a and the second insertion hole 45b are each examples of an insertion hole of the holder base 45 of the disclosure.

Referring to FIG. 3, the blade 34 has a elongated rectangular shape having a thickness. The blade 34 has a first insertion hole 34a for inserting the first fragile part 42a, and a second insertion hole 34b for inserting the second fragile part 42b. The first insertion hole 34a and the second insertion hole 34b of the blade 34 are each examples of an insertion hole of the blade 34 of the disclosure. The first insertion hole 34a and the second insertion hole 34b penetrate the blade 34 in the thickness direction. Additionally, the blade 34 has a hole 34c penetrating the holder base 45 in the thickness direction.

Referring to FIG. 2, the first fragile part 42a of the holder adapter 42 is inserted into the first insertion hole 45a of the holder base 45, and the second fragile part 42b of the holder adapter 42 is inserted into the second insertion hole 45b of the holder base 45 such that relative rotation between the holder adapter 42 and the holder base 45 is prevented (It should be noted, there may be some movement (rotation) between the holder adapter 42 and the holder base 45 due to a gap (tolerance) between the fragile parts 42a, 42b and the insertion holes 45a, 45b of the holder base 45).

Next, the first fragile part 42a of the holder adapter 42 is further inserted into the first insertion hole 34a of the blade 34, and the second fragile part 42b of the holder adapter 42 is further inserted into the second insertion hole 34b of the blade 34 such that relative rotation between the holder adapter 42 and the blade 34 is prevented (It should be noted, there may be some movement (rotation) between the holder adapter 42 and the blade 34 due to a gap (tolerance) between the fragile parts 42a, 42b and the insertion holes 34a, 34b of the blade 34). In this way, in an axial direction of the shaft 32, the holder base 45 is disposed between the holder adapter 42 and the blade 34.

Referring to FIG. 3, the shaft 32 has a hole 32c. The hole 32c is threaded. The shaft 32, the holder adapter 42, the holder base 45 and the blade 34 are fastened together with a bolt 300 via fastening the bolt 300 to the thread of the hole 32c of the shaft 32. It should be noted, a washer (not shown) or the like may be used when fastening the bolt 300 according to requirements. In the present embodiment, the holes 42c, 45c, 34c are not threaded. However, the disclosure is not limited thereto. In another embodiment of the disclosure, the hole 42c of the holder adapter 42, the hole 45c of the holder base 45, the hole 34c of the blade 34 may be threaded or a combination of threaded and not threaded according to requirements. A fastening direction of the bolt 300 is, for example, the same as a rotation direction of the blade 34 during grass cutting. A loosening direction of the bolt 300 is, for example, opposite to the rotation direction of the blade 34 during grass cutting.

Referring to FIG. 2, in the present embodiment, the first fragile part 42a is inserted into the first insertion hole 34a of the blade 34, and the first fragile part 42a is configured to be flush with the bottom surface of the blade 34. However, the disclosure is not limited thereto. In another embodiment of the disclosure, the first fragile part 42a may be inserted into the first insertion hole 34a of the blade 34, and the first fragile part 42a may protrude out from the bottom surface of the blade 34. Similarly, the second fragile part 42b may protrude out from the bottom surface of the blade 34.

Referring to FIG. 2, the shaft 32 is inserted into the insertion hole 42d of the holder adapter 42. The holder base 45 holds the blade 34, and the holder adapter 42 holds the shaft 32. More specifically, the holder base 45 engages with the blade 34, and the holder adapter 42 engages with the shaft 32. In addition, the holder adapter 42 engages with the holder base 45.

Figure 4:
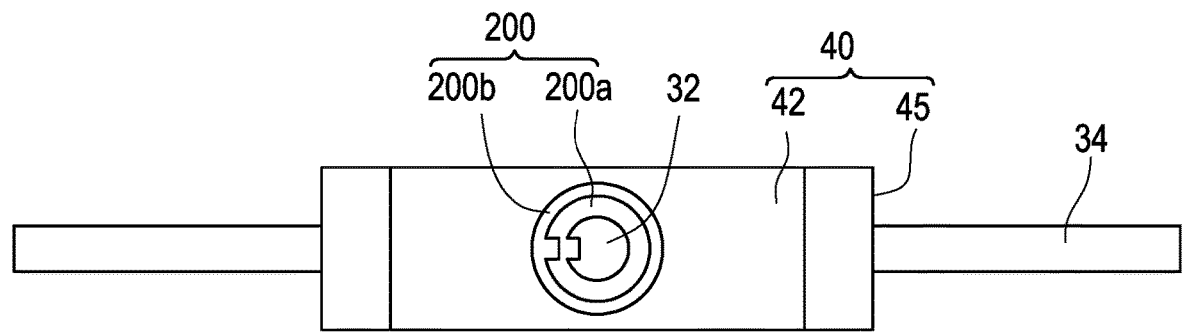
FIG. 4 illustrates a top view of the working part of FIG. 2.

FIG. 4 illustrates a top view of the working part of FIG. 2. Referring to FIG. 4, the blade holder 40 includes a collar 200 surrounding the shaft 32, and the collar 200 engages with the holder adapter 42 and does not engage with the holder base 45. The collar 200 has a substantially ring shape. In this way, the collar 200 may facilitate the removal of the holder adapter 42 from the holder base 45, and therefore reutilizing the holder base 45 in the case when the shear pins 42a, 42b of the holder adapter 42 break becomes easier.

In the present embodiment of FIG. 4, the collar 200 includes a plurality of collars 200a, 200b provided in a radial direction of the shaft 32, and each of the plurality of collars 200a, 200b has a fitting part that fits with a fitting part on another of the plurality of collars 200a, 200b. The fitting part is, for example, a key disposed on the collar. However, the disclosure is not limited thereto. In another embodiment, the fitting part may be, for example, a recess disposed on the collar for fitting the key of another collar. In another embodiment, the fitting part may be a set screw. The disclosure is not limited thereto and the fitting part of the collar 200a, 200b may be any part configured to locks the rotation of the shaft 32 with the rotation of the blade holder 40 (the holder adapter 42). Each collar 200a, 200b may have more than one fitting part and may be set according to requirements.

Referring to FIG. 4, the shaft 32 has a key which is a recess that is rotationally locked to the a key of first collar 200a which is a protrusion. Next, the first collar 200a has a recess that is rotationally locked to the key of the second collar 200b which is a protrusion. The collar 200b may be fixed to the holder adapter 42 by another fixing part not shown. In this way, the blade 34 is rotatably driven by the mowing motor 30 via the shaft 32, the collar 200, and the blade holder 40 (including the holder adapter 42 and the holder base 45). In this way, the holder adapter 42 is configured to be compatible with the shaft 32 of different diameters by attaching or detaching one or a plurality of the collars 200a, 200b according to the diameter of the shaft 32. In this way, a reduction in manufacturing cost may be achieved by standardizing the parts. A number of the plurality of collars may be set according to requirements and is not intended to limit the disclosure.

Figure 5:
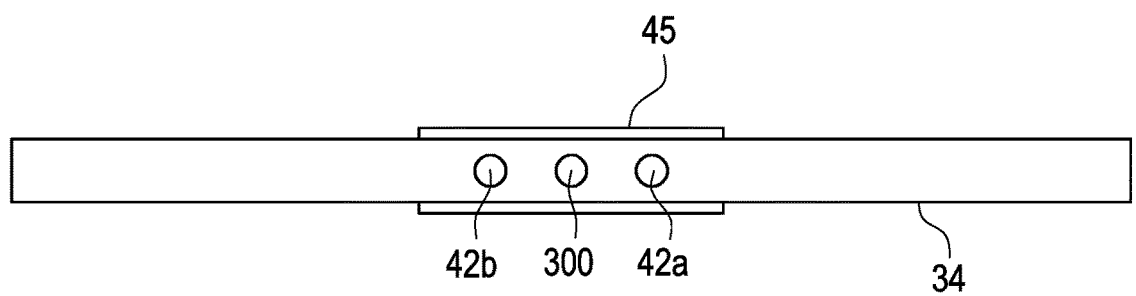
FIG. 5 illustrates a bottom view of the working part of FIG. 2.

FIG. 5 illustrates a bottom view of the working part of FIG. 2. In the present embodiment, the blade 34 is configured as an elongated substrate (a substantially rectangular shape having a thickness). In another embodiment of the disclosure, the blade 34 may be configured as a substantially circular shape. However, the disclosure is not limited thereto and the shape of the blade 34 may be configured as other shapes according to requirements. In addition, the holder adapter 42 and the holder base 45 of the present embodiment are configured as an elongated substrate (a substantially rectangular shape). However, the disclosure is not limited thereto and the shape of the holder adapter 42 and the holder base 45 may be configured as other shapes according to requirements. For example, the holder adapter 42 and the holder base 45 may be configured as substantially circular shapes. Furthermore, the number of the fragile parts may be set according to requirements and is not intended to limit the disclosure.

Figure 6:
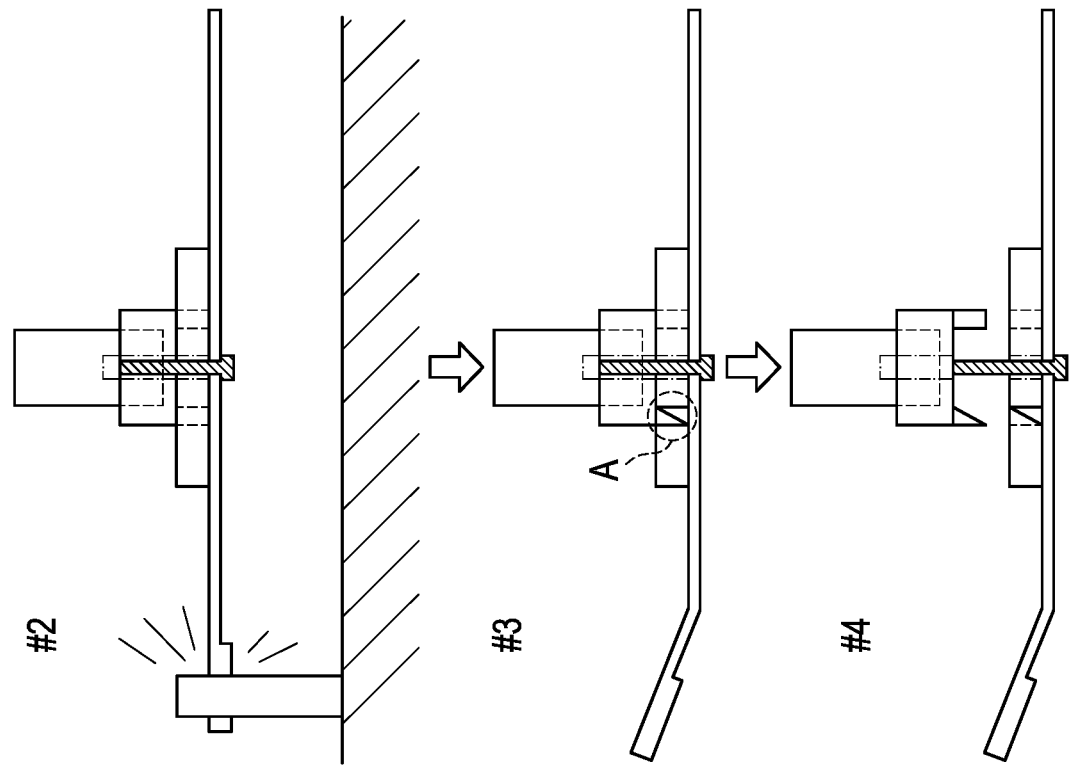
FIG. 6 illustrates a flow diagram of replacing parts of the working part.
Figure 6:
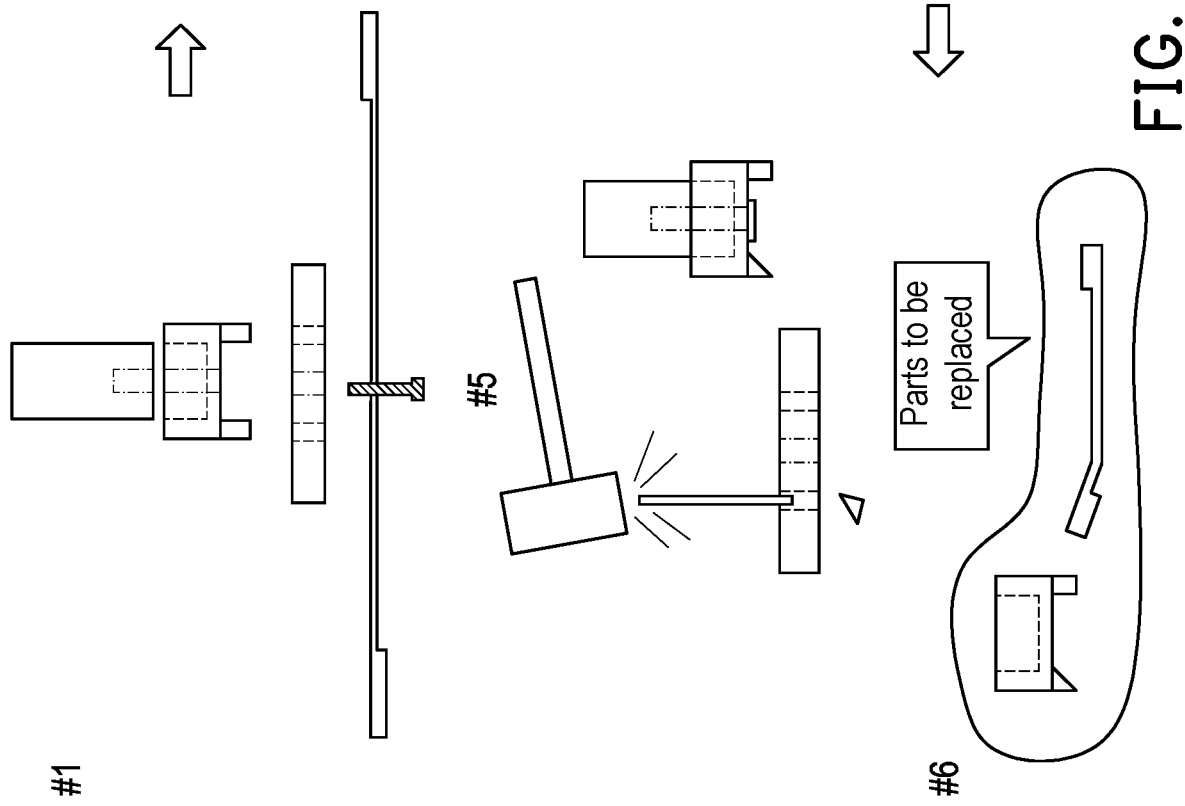

FIG. 6 illustrates a flow diagram of replacing parts of the working part. Referring to FIG. 6 #2, according to an embodiment of the disclosure, a fastening force of the bolt 300 (for example, a force that is necessary to loosen the bolt 300) may be weaker than a torsional rigidity of the shaft 32 and a torsional rigidity of the blade 34. In this way, in a case when the blade 34 strikes an obstacle during grass cutting, a force required to generate relative rotation between the holder adapter 42 and the holder base 45 (by overcoming the fastening force of the bolt 300) is smaller than a rotational force (a torsional force) that may cause damage to the shaft 32 and the blade 34. By configuring the fastening force of the bolt 300 to be weaker than the torsional rigidity of both the shaft and the blade 34, the bolt 300 may loosen such that the holder adapter 42 and the holder base 45 may rotate relative to each other before damage is inflicted onto the shaft 32 and the blade 34 in a case that the blade 34 strikes an obstacle during grass cutting, thereby preventing the blade 34 and the shaft 32 from breaking. A lower limit of the fastening force of the bolt 300 may be set to a force in which the blade 34 does not fall off during normal operation of the lawn mower 10. An upper limit of the fastening force of the bolt 300 may be set to a force in which the first fragile part 42a and the second fragile part 42b may still break without causing damage to the shaft 32 and the blade 34 when the blade 34 strikes an obstacle during grass cutting.

Referring to FIG. 6 #3, as shown in the encircled area A for example, when the holder adapter 42 and the holder base 45 rotate relative to each other, the first fragile part 42a and/or the second fragile part 42b may break when excess load is generated on the blade 34 of a lawn mower 10. That is to say, the first fragile part 42a and/or the second fragile part 42b will break when a predetermined shear force is applied. In other words, according to the present embodiment of the disclosure, the predetermined shear force required to break the first fragile part 42a or the second fragile part 42b is smaller than a torsional force which may cause damage to the shaft 32 and/or the blade 34.

In comparison, in a case when the fastening force of the bolt 300 is stronger than a torsional rigidity of the shaft 32 and/or a torsional rigidity of the blade 34, when the blade 34 strikes an obstacle during grass cutting, the shaft 32 and/or the blade 34 may be damaged prior to the bolt 300 becoming loosened. When the bolt 300 is not loosened, a relative rotation between the holder adapter 42 and the holder base 45 (by overcoming the fastening force of the bolt 300) cannot be generated since the holder adapter 42 and the holder base 45 are fixed by the fastening force of the bolt 300. Without the relative rotation between the holder adapter 42 and the holder base 45, then the first fragile part 42a and/or the second fragile part 42b may not break, which in turn causes the blade 34 and the shaft 32 to bear the brunt of the impact force and causes the blade 34 and the shaft 32 to become damaged.

When the first fragile part 42a and/or the second fragile part 42b breaks, then the blade 34 may no longer rotate together with the rotation of the shaft 32. For example, when the first fragile part 42a and/or the second fragile part 42b breaks, the blade 34 may be idle (not rotate) to protect the shaft 32 even when the motor 30 and the shaft 32 are rotating. When the first fragile part 42a and/or the second fragile part 42b breaks, for example, the holder adapter 42 may rotate together with the shaft 32, while the holder base 45 remains idle and/or engaged with the blade 34. In this way, the relative rotation continues between the holder adapter 42 and the holder base 45 when the first fragile part 42a and/or the second fragile part 42b breaks.

In the present embodiment, a material of the holder adapter 42 has a weaker rigidity than a material of the holder base 45. In this way, when the first fragile part 42a and/or the second fragile part 42b breaks and relative rotation is generated between the holder adapter 42 and the holder base 45, damage to the holder base 45 is prevented to protect the holder base 45. Since the material of the holder base 45 has a stronger rigidity than the holder adapter 42, the holder adapter 42 might incur damage through the relative rotation between the holder adapter 42 and the holder base 45 but damage to the holder base 45 is minimized such that the holder base may be reused with the replacement holder adapter 42. For example, a material of the holder base 45 may be iron while a material of the holder adapter 42 may be aluminum.

In the present embodiment, a relationship between the various rigidities and frictional forces are described as following: Torsional rigidity of the fragile part (shear bolt) <friction force due to bolt fastening<rigidity of the blade<rigidity of the shaft.

In another embodiment of the disclosure, a material of the holder adapter 42 may not necessarily have a weaker rigidity than a material of the holder base 45. For example, the holder adapter 42 and the holder base 45 may be a same material and have the same rigidity. In another embodiment of the disclosure, a material of the holder adapter 42 may have a stronger rigidity than a material of the holder base 45. The above are examples only and are not intended to limit the disclosure. A material of the holder adapter 42 may be, for example, a metal, a plastic, composite and the like. A material of the holder base 45 may be, for example, a metal, a plastic, composite and the like. The above materials are examples only and are not intended to limit the disclosure.

Next, as shown in FIG. 6 #6, since the first fragile part 42a and the second fragile part 42b which are broken are included in the holder adapter 42, the holder adapter 42 may be replaced with a new holder adapter 42 while the holder base 45 does not need to be replaced and may be reused. In addition, in another embodiment of the disclosure, the blade 32 may also be replaced in addition to the holder adapter 42 in the case the blade 32 is damaged from, for example, the impact with the obstacle. In this way, the entire blade holder 40 does not have to be replaced even when the fragile part 42a, 42b are broken, and only the holder adapter 42 needs to be replaced and cost reduction may be achieved.

In addition, by separating the blade holder 40 into two parts, namely into the holder adapter 42 and the holder base 45, a length of the first fragile part 42a and a length of the second fragile part 42b is lengthened (increased) to accommodate the thickness of the holder base 45. In comparison, in a case where the holder base 45 is not included in the blade holder 40 (or the blade holder 40 is not separated into two parts), the length of the first fragile part 42a and the length of the second fragile part 42b will be relatively short since the first fragile part 42a and the second fragile part 42b will have a length corresponding to the thickness of the blade 34. When the length of the first fragile part 42a and the length of the second fragile part 42b are relatively short by corresponding to the thickness of the blade 34, the first fragile part 42a and the second fragile part 42b may be harder to break when the blade 34 strikes an obstacle.

Referring to FIG. 6 #5, in the present embodiment, an upper surface and a lower surface of the holder base 45 are both substantially flat surfaces. In this way, broken pieces of the fragile part that remain in the insertion holes 45a, 45b of the adapter base 45 may be removed easily since the adapter base 45 makes it easier to mount and remove the broken pieces. However, the disclosure is not limited thereto. In another embodiment of the disclosure, the upper surface of the holder base 45 may be an uneven surface and include a protrusion(s) and/or a recess(s). Similarly, in other embodiments, the lower surface of the holder base 45 may be an uneven surface and include a protrusion(s) and/or a recess(s).

The shear bolt (the fragile part 42a, 42b) has a diameter, for example, that is smaller than a diameter of the shaft 32. In addition, the motor 30 may have a load detector which detects the load on the motor shaft, such that the motor 30 may be stopped in a case when the shear pin (the fragile part 42a, 42b) is broken by a high load applied to the blade 34.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A lawn mower, comprising:
a shaft rotated by a drive source;
a blade;
a blade holder fixing the shaft and the blade, the blade holder comprising:
a holder base holding the blade;
a holder adapter holding the shaft;
wherein the holder adapter includes a fragile part monolithically formed therewith,
wherein the blade has an insertion hole for inserting the fragile part, and
wherein the holder base is able to rotate relative to the holder adapter upon shearing of the fragile part.

2. The lawn mower according to claim 1, wherein the holder base has an insertion hole for inserting the fragile part, and a surface of the holder base is substantially flat.

3. The lawn mower according to claim 1, wherein the shaft, the holder adapter, the holder base and the blade are fastened together with a bolt,
the holder base has an insertion hole for inserting the fragile part,
a fastening force of the bolt is weaker than a torsional rigidity of the shaft and a torsional rigidity of the blade.

4. The lawn mower according to claim 3, wherein a material of the holder adapter has a weaker rigidity than a material of the holder base.

5. The lawn mower according to claim 1, wherein the blade holder includes a collar surrounding the shaft, and the collar engages with the holder adapter and does not engage with the holder base.

6. The lawn mower according to claim 2, wherein the blade holder includes a collar surrounding the shaft, and the collar engages with the holder adapter and does not engage with the holder base.

7. The lawn mower according to claim 3, wherein the blade holder includes a collar surrounding the shaft, and the collar engages with the holder adapter and does not engage with the holder base.

8. The lawn mower according to claim 4, wherein the blade holder includes a collar surrounding the shaft, and the collar engages with the holder adapter and does not engage with the holder base.

9. The lawn mower according to claim 5, wherein the collar includes a plurality of collars provided in a radial direction of the shaft, and each of the plurality of collars has a fitting part that fits with a part on another of the plurality of collars.

10. The lawn mower according to claim 6, wherein the collar includes a plurality of collars provided in a radial direction of the shaft, and each of the plurality of collars has a fitting part that fits with a part on another of the plurality of collars.

11. The lawn mower according to claim 7, wherein the collar includes a plurality of collars provided in a radial direction of the shaft, and each of the plurality of collars has a fitting part that fits with a part on another of the plurality of collars.

12. The lawn mower according to claim 8, wherein the collar includes a plurality of collars provided in a radial direction of the shaft, and each of the plurality of collars has a fitting part that fits with a part on another of the plurality of collars.

* * * * *